UNITED STATES PATENT OFFICE.

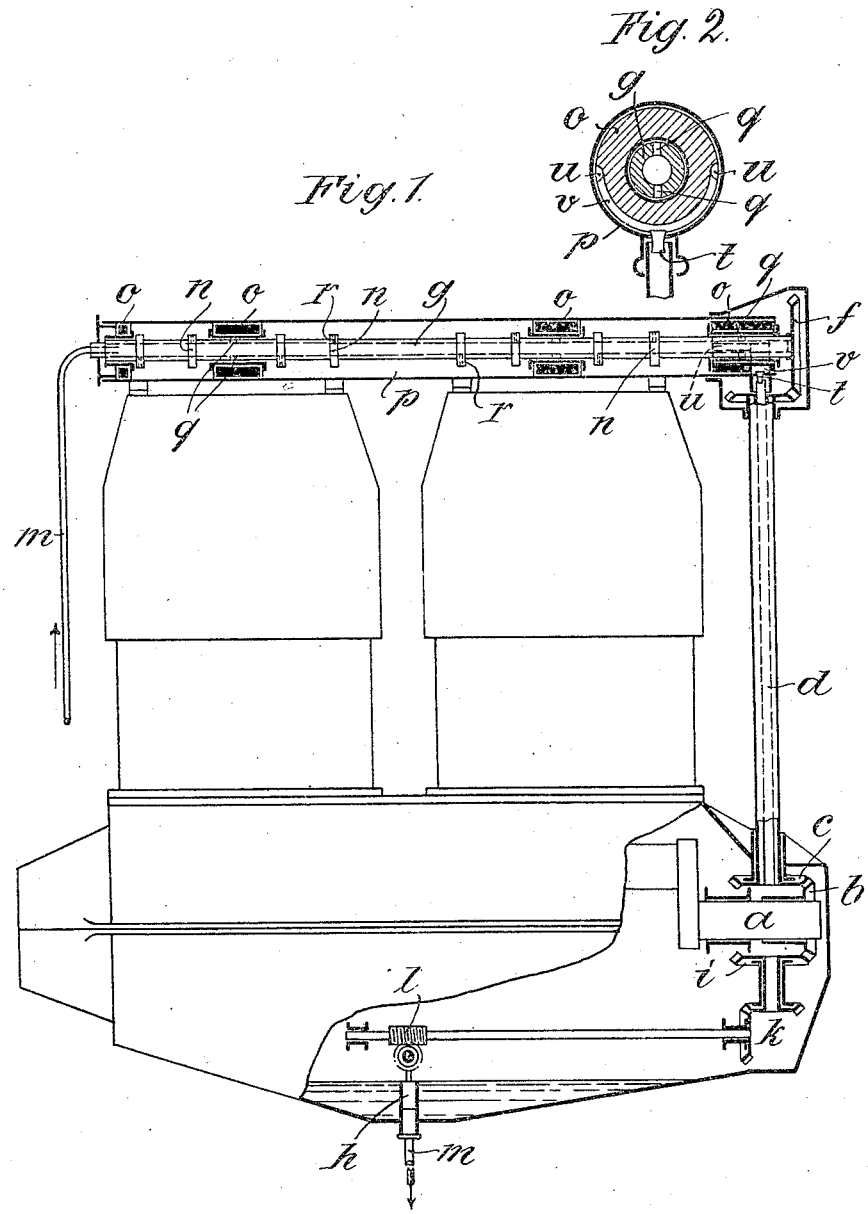

PAUL DAIMLER, OF CANNSTATT, GERMANY, ASSIGNOR TO DAIMLER-MOTOREN-GESELLSCHAFT, OF UNTERTURKHEIM, GERMANY, A FIRM.

SYSTEM OF CIRCULATING LUBRICATION FOR INTERNAL-COMBUSTION MOTORS.

1,199,351.	Specification of Letters Patent.	Patented Sept. 26, 1916.

Application filed March 26, 1915. Serial No. 17,270.

*To all whom it may concern:*

Be it known that I, PAUL DAIMLER, subject of the King of Wurttemberg, residing at 87 Waiblingerstrasse, Cannstatt, in the Kingdom of Wurttemberg, German Empire, have invented certain new and useful Improvements in Systems of Circulating Lubrication for Internal-Combustion Motors, of which the following is a specification.

The present invention relates to the lubrication of the valve gear of internal combustion engines.

In engines of this kind it is old to employ a hollow cam shaft, to drive the lubricant under pressure through said shaft and to cause it to escape through radial channels provided in said shaft close to the cam shaft bearings and to the surfaces of the cams.

According to the present invention the circulating lubrication system described is improved by combining it with an outside lubrication of the cams and bearings, the said lubrication from outside forming part of the circulation system so as to secure a permanent regeneration of the oil effecting the outside lubrication. To this end the oil in excess flowing off the bearings and cams lubricated from inside the shaft is stopped up within the tube shaped casing surrounding the cam shaft by providing within said casing an overflow adapted to keep the oil in the casing at a certain level, the oil in excess flowing back to the oil tank. In order to allow the oil from all parts of the cam shaft casing to flow back to the tank the shaft bearings dividing said casing into a number of separate chambers are provided with channels connecting said chambers, and the last bearing located at the front end of the casing away from the oil inlet is further provided with peripheral grooves communicating with the connecting channel and conducting the oil in excess back to the oil tank.

In a lubricating system of this kind a single oil feed tube only is provided for the cam shaft bearings, whereas the oil in excess flowing off the bearings is employed for the auxiliary lubrication from outside. This causes the oil pressure to remain constant and always the same quantity of oil to be fed to the parts to be lubricated and to the cam shaft casing in general. Thus all parts are uniformly fed with lubricant of equal qualities.

The new system is especially advantageous for use with aeroplane motors where safe working of the engine under varying conditions is decisive.

The drawings affixed to this specification show the preferred form of a lubricating system according to the present invention.

In the drawings Figure 1 is an elevation of an upright motor having the cam shaft arranged above the cylinders, said motor being adapted to be used as well in an automobile as on an aeroplane. Fig. 2 is a cross section of the cam shaft and casing drawn to a bigger scale.

The crank shaft $a$ of the motor carries a bevel gear wheel $b$ gearing with another bevel gear wheel $c$ on the vertical shaft $d$. A bevel gear wheel $e$ fixed on the other end of the vertical shaft is in gear with a bevel gear wheel $f$ on the cam shaft $g$. The crank shaft $a$ further drives an oil pump $h$ by means of bevel gear wheels $i$, $k$ and worm gear $l$. The oil pump presses the oil from the oil tank through tubing $m$ into the hollow cam shaft $g$ carried within a casing $p$ by bearings $o$. The pressure created by the oil pump together with the centrifugal action causes the oil to escape from the shaft $g$ through channels $q$ leading to the bearings and through channels $r$ leading to the cam surfaces and to the valve gear. As the circulation system described effects a lubrication in excess, the oil in excess must be carried back to the oil tank through the casing $p$. Channels are provided to this end in the bearings, said channels connecting the chambers formed between the bearings with each other and the channel in the bearing near the vertical shaft $d$ forms a connection between the casing and the interior of said shaft, the return of the oil to the tank being thereby assured.

A funnel $t$ is inserted between the casing $p$ and the hollow shaft $d$. Instead of using the vertical shaft for the oil return a special tubing may be provided.

In order to combine the circulation lubrication proper from inside the cam shaft with an outside lubrication by simple immersion of the parts to be lubricated, the outer bearing $o$ of the cam shaft next to the vertical driving shaft $d$ is provided with channels $u$ (Fig. 2) placed at a suitable level so as to dam up the oil and to keep the lower parts of the cams and bearings constantly immersed in oil. A semi-peripheral groove *v* serves as a communication between the cross-channels *u* and the vertical shaft *d*.

I claim:—

1. In a system of circulating lubrication for internal combustion motors, in combination, a hollow cam shaft having radial channels adapted to connect the interior of said shaft with its outer surface, a casing surrounding said shaft, means for pressing oil into said shaft at one end and means for keeping the oil escaping through said channels into said casing at such a level, that said shaft dips into the oil contained in said casing.

2. In a system of circulating lubrication for internal combustion motors, in combination, a hollow cam shaft having radial channels adapted to connect the interior of said shaft with its outer surface, a casing surrounding said shaft, means for pressing oil into said shaft at one end and means for damming up the oil escaping through said radial channels into said casing.

3. In a circulating lubrication system for internal combustion motors, the combination of a hollow cam shaft having radial channels leading from its interior to its outer surface, a casing surrounding said shaft, bearings for the shaft within the casing, and means for forcing oil into said shaft from one end, the bearing most remote from the oil admission having a substantially horizontal channel at a level above the lowest points of the cams.

4. In a circulating lubrication system for internal combustion motors, the combination of a hollow cam shaft having radial channels extending from its interior to its outer surface, a casing surrounding said shaft, bearings for said shaft within the casing and means for forcing oil into said shaft from one end, the bearing most remote from the oil admission having a substantially horizontal channel extending at a level above the lowest points of the cams and the intermediate bearings having horizontal overflow channels.

In testimony whereof I affix my signature in presence of two witnesses.

PAUL DAIMLER.

Witnesses:
ROBERT UHLAM,
EUGENE SCHLENKER.